United States Patent [19]

Sugawara

[11] Patent Number: 4,981,900

[45] Date of Patent: Jan. 1, 1991

[54] EPDM RUBBER SEALS FOR HYDRAULIC CYLINDERS

[75] Inventor: Hiroshi Sugawara, Yokohama, Japan

[73] Assignee: Nissan Motor Co., Ltd., Yokohama, Japan

[21] Appl. No.: 258,273

[22] Filed: Oct. 17, 1988

[30] Foreign Application Priority Data

Oct. 22, 1987 [JP] Japan ................................ 62-265238

[51] Int. Cl.$^5$ .............................................. C08K 3/04
[52] U.S. Cl. ................................... 524/496; 524/570; 524/571; 525/331.7
[58] Field of Search ................ 524/496, 570, 571; 525/331.7

[56] References Cited

U.S. PATENT DOCUMENTS

| | | | |
|---|---|---|---|
| 4,309,332 | 1/1982 | Fischer et al. | 524/87 |
| 4,335,227 | 6/1982 | Bender et al. | 525/329.9 |
| 4,808,643 | 2/1989 | Lemaine et al. | 524/87 |

FOREIGN PATENT DOCUMENTS 2130748  12/1971  Fed. Rep. of Germany ... 525/331.7

OTHER PUBLICATIONS

T. Fukui, The Synthetic Rubber, No. 91 (1983), pp. 27-35, "Extrusion Processability of EPM/EPDM".

*Primary Examiner*—Joseph L. Schofer
*Assistant Examiner*—Mark Sweet
*Attorney, Agent, or Firm*—Foley & Lardner, Schwartz, Jeffery, Schwaab, Mack, Blumenthal & Evans

[57] ABSTRACT

The invention relates to EPDM rubber seals for use in hydraulic cylinders such as the cylinders of automotive brake and clutch systems. Using an EPDM rubber composition carefully formulated so as to be good in kneadability, rubber seals having good resistance to yielding or loss of resiliency by fatigue as well as sufficient strength and elongation are obtained. Essential components of the rubber composition are 100 parts by weight of EPDM copylymer rubber, 30-80 parts by weight of carbon black and 1-5 parts by weight of a peroxide as cross-linking agent. It is important to use an EPDM copolymer in which the distribution of ethylene is uneven such that the content of ethylene is highest in a fraction highest in molecular weight and is lowest in another fraction lowest in molecular weight. The difference in ethylene content between these two fractions of the copolymer should be more than 5 wt.% and not more than 9 wt %.

11 Claims, No Drawings

EPDM RUBBER SEALS FOR HYDRAULIC CYLINDERS

BACKGROUND OF THE INVENTION

This invention relates to packings or seals for hydraulic cylinders, the seals being formed of an ethylene-α-olefin-diene copolymer rubber composition. In particular the invention is suitable for application to automotive hydraulic cylinders such as brake and clutch master cylinders, wheel cylinders of drum brake systems and disc cylinders of disc brake systems.

As seal materials for automotive hydraulic cylinders natural rubber and styrene-butadiene rubber (SBR) have long been used, but in recent years ethylene-propylene-diene terpolymer rubbers (EPDM), which are superior in high- and low-temperature resistance and aging resistance, have been prevailing as the engine room temperatures have been rising and as brake fluids of higher boiling points have been employed. In some cases propylene in EPDM is replaced by another α-olefin.

Generally EPDM is not good in kneadability, particularly with rolls, and this offers a problem to industrial preparation of EPDM rubber compositions. A compensatory measure is using EPDM relatively low in Mooney viscosity, but this is unfavorable for other properties of EPDM since reducing Mooney viscosity means reducing molecular weight. Using low molecular weight EPDM it is difficult to obtain rubber seals which can long remain stable and effective in automotive hydraulic cylinders.

As seal materials for automotive hydraulic cylineres EPDM rubber compositions are desired to be good in kneadability and, by molding and curing, can provide seals low in susceptibility to yielding (loss of resiliency) by fatigue. However, such desire cannot easily be met. As is known, for improving resistance to yielding by fatigue there is the need of using an EPDM of high molecular weight with narrow distribution of molecular weight. However, this is contradictory to the desire for improved kneadability and increases the material cost. Besides, if this measure is taken indeliberately the resultant EPDM compositions will possibly suffer from bad dispersion of a particulate filler such as carbon black.

SUMMARY OF THE INVENTION

It is an object of the present invention to provide EPDM rubber seals for hydraulic cylinders, in particular automotive hydraulic cylinders, which seals are formed of an EPDM rubber composition good in kneadability and have excellent physical properties including good resistance to yielding by fatigue.

According to the invention there is provided a rubber seal for a hydraulic cylinder, the seal being formed of a rubber composition comprising as essential components 100 parts by weight of an EPDM rubber component consisting of at least one ternary copolymer of ethylene, an α-olefin and a diene, 30–80 parts by weight of carbon black which is from 0.025 to 0.055 μm in mean particle size and 1.0–5.0 parts by weight of a peroxide, the rubber composition in cured state being not more than 10 wt % in the amount of boiling benzene soluble matter, the EPDM rubber component satisfying the following conditions (a) to (e):

(a) the content of ethylene is not less than 50 wt % and less than 65 wt %;

(b) the content of α-olefin is not less than 35 wt % and less than 50 wt %;

(c) Mooney viscosity is in the range from 35 to 60;

(d) the amount of cyclohexane insoluble matter is from 5 to 10 wt %; and (e) with respect to the distribution of molecular weight the distribution of the content of ethylene is uneven such that the degree of unevenness of ethylene content, $C_H - C_L$, is more than 5.0 wt % and not more than 9.0 wt %, where $C_H$ represents the content of ethylene in a first fraction which amounts to 20 wt % of the copolymer and has higher molecular weights than in the remaining fractions, and $C_L$ represents the content of ethylene in a second fraction which amounts to 20 wt % of the copolymer and has lower molecular weights than in the remaining fractions.

Usually propylene is used as the α-olefin. The EPDM rubber component of the rubber composition may be a blend of two kinds of ternary copolymers of ethylene, an α-olefin and a diene.

As will be understood from the above statement, an important feature of the invention resides in using an EPDM copolymer rubber in which the distribution of ethylene content is uneven, with respect to the distribution of molecular weight, such that relatively large amounts of polyethylene segments are contained in higher molecular weight fractions of the copolymer. The invention is primarily based on the discovery that an EPDM rubber composition which is good in kneadability and, in molded and cured form, is low in susceptibility to yielding by fatigue can be obtained by using an EPDM copolymer rubber containing an adequate amount of an polyethylene-rich fraction. Presumably the improved kneadability is attributed to melting of the polyethylene-rich fraction of the copolymer rubber and resultant softening of the rubber composition at the kneading temperatures of about 90°–140° C.

Rubber seals according to the invention are very suitable for use in hydraulic cylinders of automotive brake and clutch systems.

DESCRIPTION OF THE PREFERRED EMBODIMENTS

An EPDM copolymer rubber for use in this invention can be obtained by a known copolymerization method. In short, ethylene, an α-olefin and a diene are copolymerized in an inactive organic solvent in the presence of a suitable catalyst under normal pressure or slightly elevated pressure.

As the α-olefin usually propylene is used. However, it is also possible to make selection from other α-olefins such as 1-butene, 1-pentene, 1-hexene, 1-octene, 1-decene and 4-methyl-1-pentene.

The diene can be selected from unconjugated linear dienes such as 1,4-hexadiene, 1,6-octadiene, 2-methyl-1,5-hexadiene, 6-methyl-1,5-heptadiene and 7-methyl-1,6-octadiene and unconjugated cyclic dienes such as cyclohexadiene, dicyclopentadiene, methyltetrahydroinden, 5-vinylnorbornene, 5-ethylidene-2-norbornene, 5-methylene-2-norbornene, 5-isopropylidene-2-norbornene and 6-chloromethyl-5-isopropenyl-2-norbornene. If desired it is also possible to make selection from trienes such as 2,3-diisopropylidene-5-norbornene-2-ethylidene-3-isopropylidene-5-norbornene, 2-propenyl-2,2-norbornadiene, 1,3,7-octatriene and 1,4,9-decatriene. Among these, 1,4-hexadiene and unconjugated cyclic dienes are very suitable, and dicyclopentadiene and 5-ethylidene-2-norbornene are particularly preferred.

As a seal material, a rubber composition is prepared by mixing a cross-linking agent and carbon black with an EPDM. Besides carbon black, some additives or fillers may optionally be added as in conventional EPDM rubber compositions. As the cross-linking agent a peroxide such as, for example, benzoyl peroxide or dicumyl peroxide is preferred.

Every EPDM rubber composition for use in this invention is required to satisfy the following conditions.

(1) In the EPDM the content of ethylene should not be less than 50 wt % and should be less than 65 wt %. If the ethylene content is less than 50 wt % the rubber composition becomes inferior in heat resistance and aging resistance. If the ethylene content reaches or exceeds 65 wt % the growth of polyethylene crystals in the EPDM becomes significant, and consequently the rubber seals produced by molding and curing the EPDM rubber composition becomes worse in resistance to yielding by fatigue.

(2) Mooney viscosity, $ML_{1+4}(100° C.)$, of the EPDM should fall in the range from 35 to 60. If the Mooney viscosity is lower than 35 the obtained rubber seals are insufficient in tensile strength and other items of physical properties. If the Mooney viscosity is higher than 60 the rubber composition is inferior in kneadability.

(3) In the EPDM the amount of cyclohexane insoluble matter should fall in the range from 5 to 10 wt %. If the amount of the insoluble matter is less than 5 wt % the rubber composition is inferior in kneadability. If the insoluble matter amounts to more then 10 wt % the EPDM is too high in the content of polyethylene and possesses considerable crystallinity, and hence the rubber seals become worse in resistance to yielding by fatigue.

(4) In the EPDM the distribution of molecular weight and the distribution of ethylene should be such that the degree of unevenness of ethylene content, $C_H-C_L$, is more than 5.0 wt % and less than 9.0 wt %. If $C_H-C_L$ is more than 5.0 wt % the rubber composition is inferior in kneadability. If $C_H-C_L$ is more than 9.0 wt % the EPDM possesses considerable crystallinity attributed to polyethylene, and hence the rubber seals become worse in resistance to yielding by fatigue.

(5) The carbon black should have a mean particle size in the range from 0.025 to 0.055 μm. Carbon blacks smaller than 0.025 μm in mean particle size are bad in dispersibility in EPDM. On the other hand, if the carbon black is larger than 0.055 μm in mean particle size the rubber seals are insufficient in tensile strength and elongation for use in automotive hydraulic cylinders.

(6) In the EPDM rubber composition the amount of carbon black should be in the range from 30 to 80 wt % of EPDM. If the amount of carbon black is less than 30 wt % of EPDM the rubber seals are insufficient in hardness and tensile strength. If carbon black amounts to more than 80 wt % of EPDM the rubber seals become worse in resistance to yielding by fatigue.

(7) In the rubber composition in molded and cured form, the amount of boiling benzene soluble matter should not be more than 10 wt %. If the soluble matter amounts to more than 10 wt % the cured rubber composition is insufficient in the degree of cross-linking, and the rubber seals will undergo considerable shrinking in automotive brake cylinders by reason of significant extraction into brake fluid.

(8) In the rubber composition the content of the peroxide employed as cross-linking agent should be in the range from 1.0 to 5.0 wt % of EPDM. If the content of the peroxide is less than 1.0 wt % of EPDM the cured rubber composition is insufficient in the degree of cross-linking and, hence, is susceptible to yielding by fatigue. If the content of the peroxide is more than 5.0 wt % of EPDM the cured rubber composition is insufficient in tensile strength and elongation for use as a seal material in automotive hydraulic cylinders.

(9) In the rubber composition the total amount of optional fillers such as calcium carbonate, zinc oxide and/or silica should not be more than 10 wt % of EPDM. If the total amount of optional fillers is larger, the obtained rubber seals become worse in resistance to yielding by fatigue.

Among the above conditions, particular importance is attached to the conditions (3) and (4). The importance of the condition (4) is explained hereinbefore. As to the condition (3), the existence of an adequate amount of cyclohexane insoluble matter stems from the desired unevenness of the distribution of ethylene in the EPDM, i.e. relatively high content of polyethylene segments in the high molecular weight fraction of the copolymer and relatively low content of polyethylene in the low molecular weight fraction.

It is possible to use a blend of two kinds of EPDM copolymers as the EPDM component of a rubber composition for use in this invention, with proviso that the EPDM obtained by blending satisfies the above described conditions (1) to (4). The blending will facilitate producing rubber compositions having well balanced kneadability and resistance to yielding by fatigue. Preferably, blending of an EPDM (EPDM1) with another EPDM (EPDM2) is made so as to satisfy the following conditions.

(A) The content of ethylene in EPDM1, C1, is from 50 to 70 wt %, and the content of ethylene in EPDM2, C2, is also from 50 to 70 wt %.

(B) The absolute value of the difference between C1 and C2 is not more than 12 wt %, i.e. $|C1-C2| \leq 12$ wt %.

(C) In each of EPDM1 and EPDM2, the distribution of molecular weight and the distribution of ethylene are such that the absolute value of the difference between $C_H$ and $C_L$, as defined hereinbefore, is not more than 12.1 wt %, i.e. $|C_H-C_L| \leq 12.1$ wt %.

The invention is illustrated by the following nonlimitative examples.

EXAMPLES 1-5

In each example an EPDM rubber composition was prepared by mixing and kneading 100 parts by weight of EPDM, 45 parts by weight of cabon black (FEF: particle size ranged from 0.040 to 0.050 μm), 5 parts by weight of zinc oxide, 1 part by weight of stearic acid and 6 parts by weight of a commercial cross-linking agent, Percumyl D-40 of Nippon Oil & Fats Co., containing 40% of dicumyl peroxide. As shown in Table 1, five kinds of ethylene-propylene-diene copolymer rubbers (EPDM) were used in Examples 1 to 5, respectively. In each EPDM the distribution of molecular weight was measured by gel permeation chromatography using o-dichlorobenzene as solvent. Then, based on the measured distribution of molecular weight the copolymer was fractionated into fractions different in molecular weight, and the content of ethylene in each fraction was measured with infrared spectrophotometer to thereby determine the value of $C_H-C_L$.

In every example the rubber composition was molded, by transfer molding, into ring-shaped seals (in the shape of a so-called cup) for a brake master cylinder and cured by heating at 170° C. for 10 min. Under the same conditions a remaining portion of the rubber composition was molded into test pieces.

Using the test pieces the hardness ($H_S$), tensile strength ($T_B$) and elongation ($E_B$) of each rubber were measured at normal temperature by the test methods according to JIS K 6301. Besides, compression set of each rubber was measured by two different methods. In the method (1), which was according to JIS K 6301, the test pieces were kept compressed at 120° C. for 22 hr. In the method (2) the test pieces were first heated at 120° C. for 22 hr and thereafter kept compressed at room temperature for 22 hr. The test results are shown in Table 2.

The kneadability of each rubber composition was evaluated by examining the degree of ease or difficulty of winding the kneaded rubber composition on calendering rolls. The manner of dispersion of carbon black in each rubber composition was examined by cutting cured test pieces with a sharp blade and observing the sections under optical microscope (×100). The results are shown in Table 2.

The ring-shaped rubber seals produced in every example were incorporated in brake master cylinders and subjected to an endurance test under the following conditions.

Test fluid: brake fluid DOT3 (glycol base).
Testing temperature: 120° C.
Piston stroke rate: 1500 strokes per hour.
Testing time: 100 hr.

On each sample of the rubber seals the interference, (outer dia. of the seal) - (inner dia. of the cylinder), was measured before and after testing to examine the amount of reduction in interference as an indication of the endurance of the rubber seal. The results are contained in Table 2.

COMPARATIVE EXAMPLES 1–5

EPDM rubber compositions were prepared in the same manner as in Examples 1–5 except that five different kinds of ethylene-propylene-diene copolymers (EPDM) were used in Comparative Examples 1–5, respectively, as shown in Table 1.

These rubber compositions were molded into ring-shaped seals and test pieces in the same manner as in Examples 1–5, and the characteristics of the rubber compositions and the rubber seals were measured by the above described test methods. The results were as shown in Table 2.

TABLE 1

|  | Ethylene Cont. (wt %) | Propylene Cont. (wt %) | Mooney Viscosity | Iodine Value | Cyclohexane Insoluble Matter (wt %) | $C_H-C_L$ (wt %) |
| --- | --- | --- | --- | --- | --- | --- |
| Ex. 1 | 55 | 45 | 45 | 30 | 7.0 | 6.0 |
| Ex. 2 | 55 | 45 | 58 | 30 | 7.0 | 6.2 |
| Ex. 3 | 55 | 45 | 45 | 20 | 7.8 | 6.1 |
| Ex. 4 | 60 | 40 | 45 | 30 | 6.2 | 4.7 |
| Ex. 5 | 65 | 35 | 48 | 30 | 8.2 | 6.8 |
| Comp. Ex. 1 | 57 | 43 | 45 | 30 | 5.8 | 0.0 |
| Comp. Ex. 2 | 65 | 35 | 40 | 20 | 8.0 | 19.0 |
| Comp. Ex. 3 | 72 | 28 | 90 | 15 | 10.5 | 3.0 |
| Comp. Ex. 4 | 59 | 41 | 55 | 30 | 4.0 | 0.0 |
| Comp. Ex. 5 | 69 | 31 | 44 | 27 | 3.0 | 2.2 |

TABLE 2

|  | $H_S$ | $T_B$ (kgf/cm²) | $E_B$ (%) | C.S. (1) (%) | C.S. (2) (%) | Kneadability | R.I. (%) |
| --- | --- | --- | --- | --- | --- | --- | --- |
| Ex. 1 | 71 | 200 | 250 | 7.0 | 14.8 | A | 18.0 |
| Ex. 2 | 72 | 205 | 260 | 6.5 | 13.0 | B | 16.2 |
| Ex. 3 | 67 | 200 | 280 | 9.0 | 20.0 | A | 24.4 |
| Ex. 4 | 72 | 200 | 250 | 7.2 | 15.0 | A | 18.5 |
| Ex. 5 | 72 | 210 | 250 | 7.4 | 15.5 | A | 19.4 |
| Comp. Ex. 1 | 71 | 190 | 250 | 7.0 | 14.8 | D | 18.1 |
| Comp. Ex. 2 | 71 | 200 | 280 | 12.0 | 55.0 | A | 67.8 |
| Comp. Ex. 3 | 75 | 220 | 290 | 18.2 | 64.3 | C | 78.4 |
| Comp. Ex. 4 | 70 | 200 | 260 | 7.0 | 14.8 | D | 18.0 |
| Comp. Ex. 5 | 71 | 190 | 250 | 7.1 | 14.9 | D | 18.2 |

C.S.(1): compression set measured by the method (1).
C.S.(2): compression set measured by the method (2).
R.I.: reduction in interference.
Kneadability
A: excellent (could be wound on rolls within 20 sec after discharge from Banbury mixer); dispersion of carbon black was also very good.
B: good (could be wound on rolls within 40 sec after discharge from Banbury mixer); dispersion of carbon black was good.
C: not good (could be wound on rolls after cooling); dispersion of carbon black was not good.
D: bad (could not be wound on rolls because of serious bagging); dispersion of carbon black was bad.

EXAMPLES 6–10

In each of Examples 6–10, a blend of two kinds of ethylene-propylene-diene copolymers (EPDM1 and EPDM2) was used as the EPDM component of a rubber composition according to the invention. The composition and characteristics of EPDM1 were variable as shown in Table 3. In every example a single kind of EPDM2 of the following characteristics was used.

EPDM2
Ethylene content: 55 wt %
Propylene content: 45 wt %
Mooney viscosity: 55
Iodine value: 34
Cyclohexane insoluble matter: 4.9 wt %
$C_H-C_L$: 4.0 wt %

In every example a rubber composition was prepared by mixing and kneading 100 parts by weight of EPDM (blend of EPDM1 and EPDM2, as shown in Table 4), 45 parts by weight of carbon black (FEF, particle size ranged from 0.040 to 0.050 μm), 5 parts by weight of zinc oxide, 1 part by weight of stearic acid and 6 parts by weight of the commercial cross-linking agent containing 40% of dicumyl peroxide.

These EPDM rubber compositions were molded into ring-shaped seals and test pieces in the same manner as in Examples 1–5, and the characteristics of the rubber compositions and rubber seals were measured by the test methods described hereinbefore. The results are shown in Table 5.

COMPARATIVE EXAMPLES 6-8

In each of Comparative Examples 6–8, an EPDM rubber composition was prepared in the same manner as in Examples 6–10 except that a blend of the EPDM2 used in Examples 6–10 with a differently selected EPDM copolymer (EPDM1) was used as shown in Tables 3 and 4. These rubber compositions were molded into ring-shaped seals and test pieces in the same manner as in Examples 1–5, and the aforementioned tests were made. The results are shown in Table 5.

TABLE 3

| | EPDM1 | | | | | |
|---|---|---|---|---|---|---|
| | Ethylene Cont. (wt %) | Propylene Cont. (wt %) | Mooney Viscosity | Iodine Value | Cyclohexane Insoluble Matter (wt %) | $C_H$—$C_L$ (wt %) |
| Ex. 6 | 55 | 45 | 45 | 32 | 7.0 | 6.5 |
| Ex. 7 | 55 | 45 | 45 | 32 | 7.0 | 6.5 |
| Ex. 8 | 60 | 40 | 55 | 32 | 8.1 | 7.5 |
| Ex. 9 | 60 | 40 | 45 | 34 | 9.0 | 10.2 |
| Ex. 10 | 65 | 35 | 40 | 34 | 9.0 | 10.5 |
| Comp. Ex. 6 | 65 | 35 | 45 | 30 | 11.0 | 18.0 |
| Comp. Ex. 7 | 72 | 28 | 90 | 15 | 10.5 | 3.0 |
| Comp. Ex. 8 | 60 | 40 | 65 | 30 | 3.0 | 0.0 |

TABLE 4

| | Mixture of EPDM1 and EPDM2 | | | | | |
|---|---|---|---|---|---|---|
| | EPDM1/ EPDM2 | Ethylene Cont. (wt %) | Propylene Cont. (wt %) | Mooney Viscosity | Iodine Value | Cyclohexane Insoluble Matter (wt %) | $C_H$—$C_L$ (wt %) |
| Ex. 6 | 50/50 | 55 | 45 | 50 | 33 | 6.0 | 5.4 |
| Ex. 7 | 70/30 | 55 | 45 | 48 | 33 | 6.4 | 5.8 |
| Ex. 8 | 60/40 | 58 | 42 | 55 | 33 | 6.8 | 6.1 |
| Ex. 9 | 30/70 | 59 | 41 | 52 | 34 | 6.1 | 5.9 |
| Ex. 10 | 30/70 | 58 | 42 | 50 | 34 | 6.2 | 5.8 |
| Comp. Ex. 6 | 70/30 | 62 | 38 | 48 | 31 | 9.2 | 13.2 |
| Comp. Ex. 7 | 85/15 | 69 | 31 | 84 | 18 | 10.1 | 2.4 |
| Comp. Ex. 8 | 50/50 | 58 | 42 | 60 | 32 | 3.9 | 1.0 |

TABLE 5

| | $H_S$ | $T_B$ (kgf/cm$^2$) | $E_B$ (%) | C.S. (1) (%) | C.S. (2) (%) | Kneadability | R.I. (%) |
|---|---|---|---|---|---|---|---|
| Ex. 8 | 71 | 200 | 260 | 7.4 | 15.9 | A | 19.1 |
| Ex. 7 | 71 | 200 | 260 | 7.3 | 16.2 | A | 19.4 |
| Ex. 8 | 71 | 205 | 270 | 7.1 | 15.2 | B | 18.5 |
| Ex. 9 | 72 | 200 | 270 | 7.1 | 15.5 | B | 18.8 |
| Ex. 10 | 72 | 200 | 260 | 7.1 | 15.9 | A | 19.1 |
| Comp. Ex. 6 | 73 | 185 | 210 | 13.0 | 58.0 | C | 75.3 |
| Comp. Ex. 7 | 74 | 220 | 270 | 18.0 | 64.0 | D | 76.1 |
| Comp. Ex. 8 | 71 | 200 | 240 | 7.4 | 16.0 | D | 19.5 |

C.S.(1): compression set measured by the method (1).
C.S.(2): compression set measured by the method (2).
R.I.: reduction in interference.
Kneadability: grades A, B, C and D are as described with respect to TABLE 2.

What is claimed is:

1. A rubber seal for a hydraulic cylinder, the seal being formed of a rubber composition comprising as essential components
   (i) 100 parts by weight of an EPDM rubber component as the sole rubber constituent, said EPDM rubber component consisting of at least one ternary copolymer of ethylene, an α-olefin and a diene,
   (ii) 30–80 parts by weight of carbon black which is from 0.025 to 0.055 μm in mean particle size, and
   (iii) 1.0–5.0 parts by weight of a peroxide; wherein said rubber composition in its cured state contains not more than 10 wt % of boiling benzene soluble matter; and wherein said EPDM rubber component satisfies the following conditions (a) to (e):
   (a) the content of ethylene is not less than 50 wt % and less than 65 wt % of said EPDM rubber component;
   (b) the content of α-olefin is not less than 35 wt % and less than 50 wt % of said EPDM rubber component;
   (c) the Mooney viscosity, $ML_{1+4}(100°$ C.), is in the range from 35 to 60;
   (d) the amount of cyclohexane insoluble matter is from 5 to 10 wt % of said EPDM rubber component; and
   (e) with respect to the distribution of molecular weight, the distribution of the content of ethylene in said EPDM rubber component is uneven such that the degree of unevenness of ethylene content, $C_H - C_L$, is more than 5.0 wt % and less than 9.0 wt %, where $C_H$ represents the content of ethylene in a first fraction which amounts to 20 wt % of the EDPM rubber component and has higher molecular weights than in the remaining fractions, and $C_L$ represents the content of ethylene in a second fraction which amounts to 20 wt % of the EDPM rubber component and has lower molecular weights than in the remaining fractions.

2. A rubber seal according to claim 1, wherein said α-olefin is propylene.

3. A rubber seal according to claim 1, wherein said α-olefin is selected from the group consisting of 1-butene, 1-pentene, 1-hexene, 1-octene, 1-decene and 4-methyl-1-pentene.

4. A rubber seal according to claim 1, wherein said diene is an unconjugated linear diene.

5. A rubber seal according to claim 4, wherein said diene is 1,4-hexadiene.

6. A rubber seal according to claim 1, wherein said diene is an unconjugated cyclic diene.

7. A rubber seal according to claim 6, wherein said diene is selected from the group consisting of dicyclopentadiene and 5-ethylidene-2-norbornene.

8. A rubber seal according to claim 1, wherein said EPDM rubber component is a blend of a first ternary copolymer of ethylene, an α-olefin and a diene and a second ternary copolymer of ethylene, an α-olefin and a diene.

9. A rubber seal according to claim 8, wherein the content of ethylene in each of said first and second ternary copolymers is in the range from 50 to 70 wt %.

10. A rubber seal according to claim 9, wherein the absolute value of the difference between the content of ethylene in said first ternary copolymer and the content of ethylene in said second ternary copolymer is not more than 12 wt %.

11. A rubber seal according to claim 10, wherein the degree of unevenness of ethylene content, $C_H - C_L$, in each of said first and second ternary copolymers is not greater than 12.1 wt %.

* * * * *